United States Patent [19]

Symons et al.

[11] 3,954,502
[45] May 4, 1976

[54] BIPOLAR ELECTRODE FOR CELL OF HIGH ENERGY DENSITY SECONDARY BATTERY

[75] Inventors: Philip C. Symons; Harry K. Bjorkman, Jr., both of Birmingham, Mich.

[73] Assignee: Energy Development Associates, Madison Heights, Ill.

[22] Filed: Sept. 8, 1975

[21] Appl. No.: 610,950

Related U.S. Application Data

[63] Continuation-in-part of Ser. No. 393,548, Aug. 31, 1973, abandoned, which is a continuation-in-part of Ser. No. 200,041, Nov. 18, 1971, abandoned.

[52] U.S. Cl. ............................ 136/86 A; 136/86 D
[51] Int. Cl.² ........................................ H01M 4/00
[58] Field of Search .............. 136/86 A, 86 E, 86 R

[56] References Cited
UNITED STATES PATENTS

| | | | |
|---|---|---|---|
| 3,188,242 | 6/1965 | Kordesch et al. | 136/86 R |
| 3,382,102 | 5/1968 | Zito | 136/30 |

*Primary Examiner*—John H. Mack
*Assistant Examiner*—H. A. Feeley
*Attorney, Agent, or Firm*—B. F. Claeboe; Richard P. Mueller; Arthur E. Kluegel

[57] ABSTRACT

A bipolar electrode apparatus for use in a secondary electrical energy storage device comprising a first member having a front and back side, a second member having a front and back side, a plurality of passageways formed by the attachment on the back sides of the first and second members and provided that the front side of the first member is the positive electrode in one cell and the front side of the second member is the negative electrode of a second cell, the first member being permeable to electrolyte but gas impermeable and adapted to pass electrolyte from the passageway through it and the second member being both gas and electrolyte impermeable.

2 Claims, 6 Drawing Figures

BIPOLAR ELECTRODE FOR CELL OF HIGH ENERGY DENSITY SECONDARY BATTERY

CROSS REFERENCE TO RELATED CASES

This case is a continuation-in-part of U.S. Ser. No. 393,548 filed Aug. 31, 1973 now abandoned which in turn is a continuation-in-part of U.S. Ser. No. 200,041 filed Nov. 18, 1971 now abandoned.

BACKGROUND OF THE INVENTION

High energy density batteries have been produced which are rechargeable, light in weight (producing at least 50 watthours or more per pound) and made from readily available materials. Recently, various attempts have been made to improve the power:weight ratio, battery performance characteristics and dependability, so as to make such batteries suitable for use to power electric drive automobiles. High energy density batteries have been made utilizing zinc-chlorine and zinc-bromine systems and in some such batteries electrodes of graphite or porous carbon have been disclosed. Although such batteries have usefully generated electricity and have had fairly satisfactory power:weight ratios, problems have been encountered in their use. Contacting of the halogen with the positive electrode has often been unsatisfactory and power:weight ratios have not been as high as desired. Such disadvantages have been overcome to a significant extent by the present invention.

SUMMARY OF THE INVENTION

This invention relates to a bipolar electrode apparatus which may be used in secondary electric energy storage devices. The apparatus which functions as a bipolar electrode between suitably designed end plates in the electric energy storage device comprises a first member having a front and a back side, a second member having a front and a back side, a plurality of passageways formed by the attachment of the back sides of the first and second members, thereby allowing an aqueous metal halide electrolyte to flow therebetween and further provided that the front side of the first member is the positive electrode in one cell and the front side of the second member is the negative electrode of a second cell, the first member being permeable to electrolyte but gas impermeable and adapted to pass electrolyte from the passageways through it and the second member being gas and electrolyte impermeable.

During charging, zinc from a zinc chloride electrolyte is deposited on to the front side of the negative electrode, during which plating chlorine is released at the positive electrode. During discharge, a solution of zinc chloride containing dissolved chlorine is passed through the bipolar electrode into the intercell spacing and electricity is generated as the zinc dissolves to form zinc ion and the chlorine is converted to a chloride ion. The electrolyte is then re-enriched with chlorine and is returned to the cell for further generation of electricity.

DESCRIPTION OF THE PREFERRED EMBODIMENTS

The present invention and its mode of operation will be readily apparent from the following description, taken in conjunction with the accompanying drawings in which.

Figure 1:
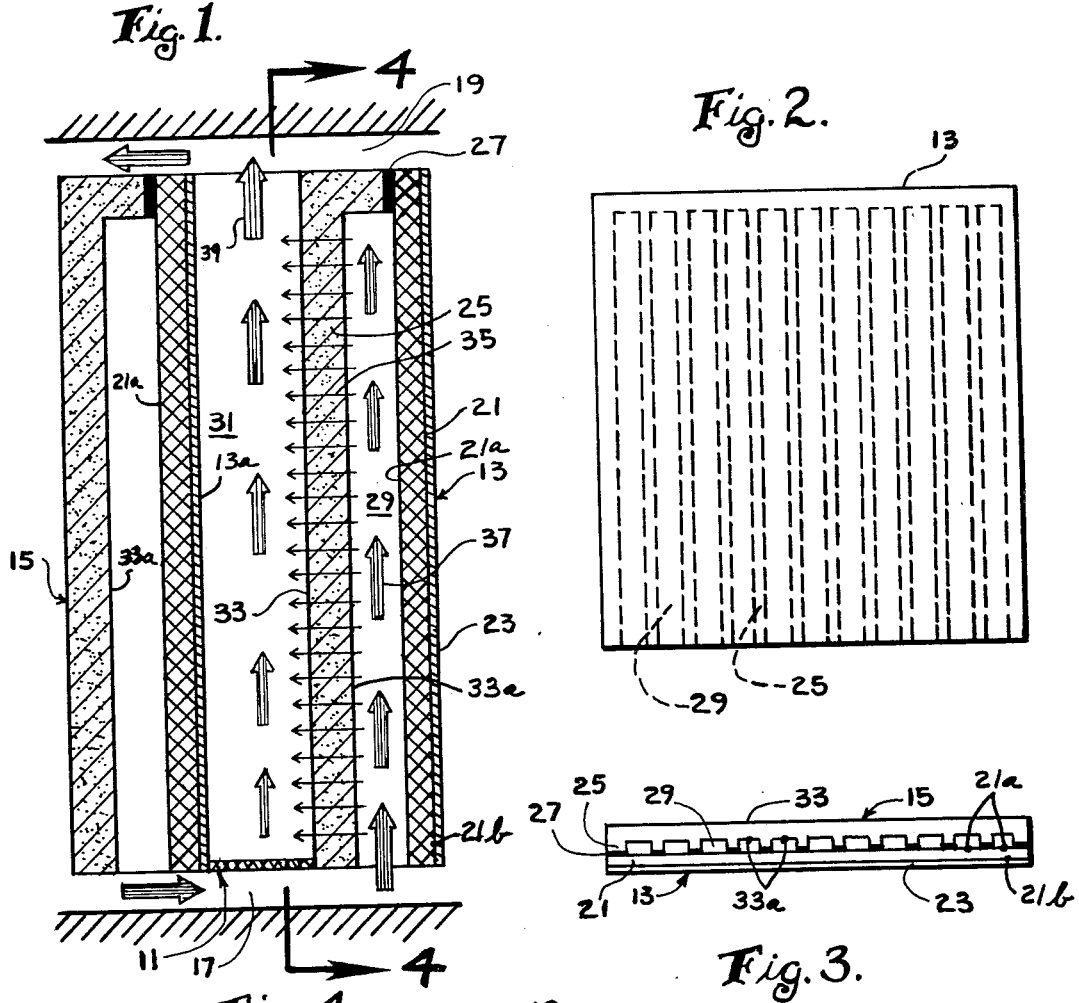
FIG. 1 is a central vertical section of a pair of bipolar electrodes of this invention, which form a cell, with the flow of electrolyte into the electrode, through it and into the reactive space of the cell being illustrated.

Referring now to the drawings, electrolytic cell 11 includes two bipolar electrodes 13 and 15 held together in a frame, not illustrated, and communicating with electrolyte inlet duct 17 and outlet manifold 19. The electrodes each have a gas impermeable and electrolyte-impermeable wall 21, preferably to graphite, which extends vertically and on its outer surface, after charging of the secondary battery of which the cell is a part, has a coating or plated layer 23 of highly electropositive metal, e.g., zinc. The inner surface of the impermeable member or wall is attached by a conductive cement to a porous electrode base member 25, such as an electrically conductive resinous polymeric cement 27. Some suitable cements are disclosed in U.S. Pat. No. 3,813,301 granted May 28, 1974 which is commonly assigned.

Figure 2:
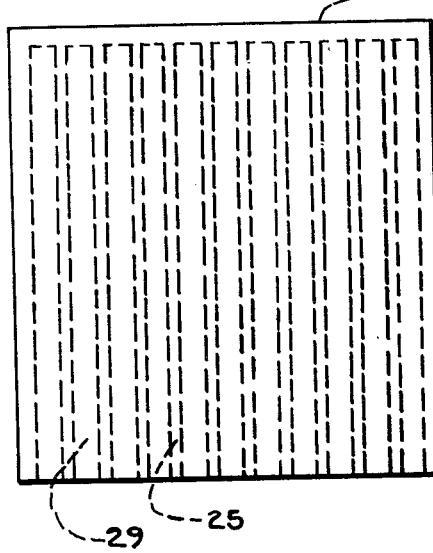
FIG. 2 is a side elevation of the electrode as seen from the metal coated side thereof.
Figure 3:
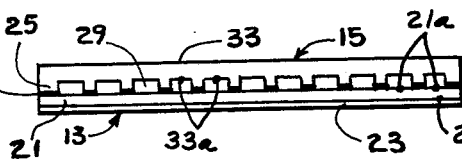
FIG. 3 is a bottom plan of the electrode of FIG. 2 showing the relative flatness of the electrode and illustrating the passageways therein.
Figure 4:
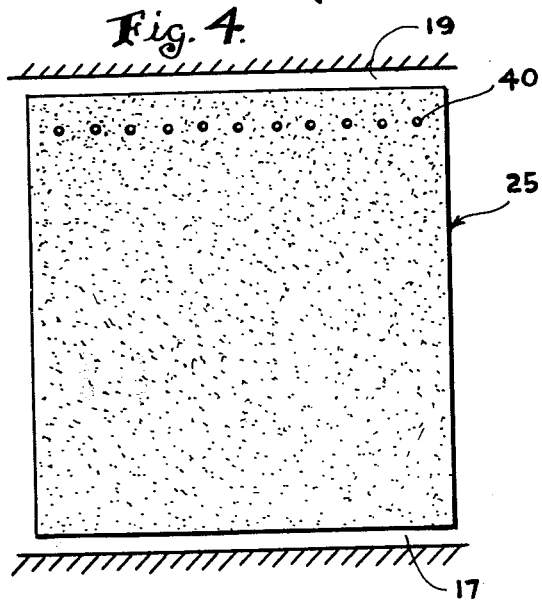
FIG. 4 is a frontal view of FIG. 1 substantially along lines 4—4 showing the face of the porous electrode with holes drawn in the upper portion thereof.

The porous member 25 and the impermeable wall or barrier 21 are coupled together with their adjacent surfaces 33-a and 21-a respectively defining a chamber or passageway 29 as illustrated in FIGS. 1 to 3 through which electrolyte may flow, uusually from the inlet 17 in the lower portion of the chamber to the upper or deeper portion of the chamber. As is represented by the arrows 35, the porous member 25 has pores along its length which extend from the inner surface 33-a to the outer surface 33, the outer surface 33 defining part of the reaction zone or inter-cell chamber 31. Electrolyte is pumped by means not illustrated through duct or inlet 17 and flows into the chamber 29 and then penetrates and passes through the porous body of member 25, as by means of its pores and next enters the reaction zone 31. Due to the pumping pressure, the flow of electrolyte is substantially continuous throughout the length of the electrolyte chamber 29, substantially uniform throughout the length of the porous member 25 and is substantially continuous throughout the length of the inter-cell or reaction chamber 31, As the electrolyte passes out of the reaction chamber, as is indicated by arrow 39, it mixes with electrolyte of other cells in outlet 19. After enrichment with chlorine, for example, electrolyte may be recirculated through the cells.

A force flow system, as is in the present invention, provides that electrolyte be in constant flow through the cell and maintains the internal chambers of the cell full at all times. The constant flow feature prevents the porous carbon member from being bound by stagnant electrolyte, thereby giving full service from the porous electrode, and prevents a deficiency of elemental halogen at the deeper part of the chamber. In a constant flow system, the desired directional flow of electrolyte through the cell is maintained and undesirable back-flows are prevented. The amount of electrolyte flowing through the cell may be regulated by suitable means, such as by adjustment of valves, or by pumping pressures or capacities.

The invention herein may be characterized as including a duplex electrode or a duplex bipolar electrode in which the electrode is composed of a plurality of elements, one element of the duplex electrode serving as the anode of one cell and another element in the same duplex electrode serving as a cathode of another, for example, an adjacent cell of the same multi-cell battery. The elements of the duplex bipolar electrode may include a porous element such as 25 in FIG. 1 coupled to an impervious element or wall or physical barrier, such as at 21 in FIG. 1. The character of the wall of 21 is such that it is impermeable to fluid, such as gas and electrolyte. The elements 25 and 21 are coupled and form a passageway or chamber 29 defined by the adjacent or interior surfaces 33-a and 21-a of the porous element and the impermeable element, respectively. On the outer or exterior surface 21-b of the impervious element is a layer of electropositive metal 23.

The duplex electrode may be used in a multi-cell battery in which the electropositive metal layer of one duplex electrode is the negative element of one cell and the porous element of the same duplex electrode is the positive electrode of an adjacent cell. The negative electrode of that adjacent cell would then be the electropositive metal layer on the next adjacent duplex electrode.

As can be seen in FIG. 1, a cell of a multi-cell battery employing duplex bipolar electrodes may include the electrolyte flow chamber 29 and at least the surface 21-a of the impermeable element, forming a part of the flow chamber 29; the porous element 25; the reaction of inter-cell chamber 31; and at least electropositive metal 13-a of the adjacent duplex bipolar electrode. The inlet or duct 17 and outlet or duct 19 serve to provide the inlet and outlet of the electrolyte flowing through the cell.

In practicing the present invention, it has been found that the flow pattern of the electrolyte, generated by the characteristics of the components of the bipolar electrode, maintains the surface 33 of the porous carbon member 25, forming part of the inter-cell reaction chamber 31, in continuing contact with dissolved chlorine that is in the electrolyte, as the electrolyte passes through the body of the porous member 25, as well as into and through the inter-cell spacing 31. No boundary layer of stagnant electrolyte insulates the halogen electrode surface from halogen as would be the case if the electrolyte was to enter the inter-cell chamber solely at the bottom of the reaction zone.

A number of cells of the type illustrated may be joined together in series to form cell banks and these may be further joined in series to increase the voltages developed, in parallel to increase current capacity or in mixed series-parallel, to do both. The batteries made according to the illustration and descriptions given are of an improved energy:weight ratio, usually over 50 watt-hours/lb. and a power:weight ratio of 20–30 watts per pound, with a peak of 50 watts per pound, when used in a zinc-chlorine system. Such batteries are strong and are suitable for use in automobiles and trucks, where they withstand the ordinary shocks attending uses of such vehicles. They are also long lasting, comparatively easy to manufacture, utilize readily available materials, recharge well and are efficient and economical to operate. Among the most important advantages of the present batteries, cells and electrodes made from the particular materials of construction and electrolyte, is the passage of the electrolyte so readily and evenly through one of the walls or members of the bipolar electrode. As indicated by arrows 35 passage of the electrolyte through the porous carbon is even from the bottom to the top while arrows 37, which diminish in size as they move upwardly, indicate the decreasing volume of electrolyte flowing in passageways 29. Arrows 39 show the correspondingly increasing volume of electrolyte through reaction zone 31. It will be evident that without the particular mechanism for contacting surface 33 with chlorine-enriched electrolyte, the efficiency of electricity generation at the upper portion of the electrode would be diminished, due to loss of chlorine in the electrolyte as it moves upwardly. Such uneven generation of electric potential at different locations on the electrodes would tend to lead to inefficient operations, due in part to internal short-circuiting.

The framework in which the elements of the present cells are held is of a suitable electrically non-conductive plastic, preferably polyvinyl chloride, PVDC, phenol formaldehyde, chlorinated polyester, acrylonitrilobutadiene-styrene resin, polypropylene or polyethylene, fluorinated polyolefins or may be of hard rubber or other suitable insulative material which is resistant to wet chlorine and aqueous metal salt solution. Preferably the frame is constructed so that it can accommodate about 10 to 30 bipolar electrodes and also provide inlet and outlet ducts or manifolds for them. However, one bipolar electrode resulting in a two cell battery may be used. In some embodiments, the frame is comprised of sections which together with the electrodes are held in unit batteries by pressure against them. Certain of the embodiments of the instant invention resemble a plate and frame filter press, and non-conductive spacers between the electrodes maintain inter-cell distances and prevent shortings due to electrode contacts.

The impervious wall, which usually extends vertically, may be made of any suitable conductive material on to which a metal surface may be deposited or plated. Although carbon filled synthetic organic resins and rubbers may be employed, it is preferred to utilize a carbon which is sufficiently impermeable so as to allow the deposit of a smooth metallic coating on the outer or front side thereof, which will not be loosened by cell or electrolyte pressure because such pressure is not transmitted through the wall. In some instances, porous carbon may be employed, treated with resins on its outer surface to make it impermeable to gas and liquid passage. It is, however, much preferred that graphite be utilized, since it is an excellent conductor, is non-reactive with the electrolyte and is capable of being readily plated by the metal of the electrode surface. Although various thicknesses of the impermeable wall portion of the electrode may be used, generally the graphite wall should be from 0.1 to 2.5 millimeters thick, preferably from 0.1 to 1 mm. The electrode itself may be of any of a wide variety of sizes, however, it is preferred to utilize one which has a major surface area (corresponding to a single outer plateable surface) of from 50 to 1,000 square centimeters, preferably from 100 to 400 square centimeters, which may discharge up to 1 ampere per square centimeter.

The porous member of the electrode is of approximately the same shape and size as the impermeable wall, since it is designed to match that member or wall and to form with it internal passageways for the electrolyte to enter the cell reaction zone. Normally, the porous member will be made from graphite or an activated carbon or animal or vegetable origin, such as are well known and have relatively high surface areas, but it can also be produced from the carbon obtained by burning or pyrolyzing oil or gas. Additionally, other known electrode materials which are electrically conductive and sufficiently resistant or inert to the environment may be employed, e.g., sintered titanium with or without rutile with a noble metal or oxide catalyst, e.g., platinum or ruthenium oxide. The use of highly divided high surface area particles improves contact of the dissolved chlorine with the inner surface of the porous electrode base, which is a wall of the cell. The porosity of the porous electrode will be such that 20% to 80% of its volume is the material of construction of the electrode with the remainder being voids, suitable for the passage of electrolyte. Preferably, the material content is from 30% to 60%. The porous electrode may be made from granules or powders of activated or other carbons of various sizes and by selection of the powder sizes and resin proportions the sizes of passageways and the percent carbon in the product can thereby be regulated. Normally, the resins which are employed to bond the carbon and the resins may be burned off or chemically removed after such bonding is effected, their removal providing paths for passage of electrolyte.

Usually the pores or passages through the porous carbon have an average diameter of from 5 to 300 microns, preferably from 10 to 100 microns, and most preferably, of 25 to 50 microns. The least transverse thickness of the porous carbon (transverse to the major surface of the electrode walls) is from 0.3 to 4 millimeters, generally from 0.5 to 2 mm. The porous carbon wall, at its thickest, is from 1 to 5 times as thick as the graphite wall.

Although either the impermeable wall or the porous electrode member may be hollowed out or grooved to contain a plurality of vertical passageways for the electrolyte, it is normally preferred to mold or otherwise form the porous electrode into a suitable shape to contain such passageways. Actually, the sealing of the impervious member to the porous member is usually used to create the passageways, which are grooves in the surface of the porous member before sealing to the impervious member. The number of passages is generally from about 5 to 25 and their measurements are from 0.5 to 2 cm. wide and 0.5 to 5 mm. in depth. The ratio of width to thickness of the passageways generally is in the range of 2:1 to 10:1. The porous member held to the impervious wall by any suitable adhesive material, preferably, a polymeric resin which is of either the thermosetting or themoplastic types. Suitable resins include epoxies and related compounds which are inert to the environment. The thickness of the resin is normally relatively low, usually from 0.01 to 0.5 mm., for the best results, and it normally covers substantially the entire contact area. The cement can also be "carbonized"; that is, heat treated to convert the cement to primarily carbon as is described in U.S. Pat. No. 3,813,301 granted May 28, 1974.

As has been described above, the porous halogen electrode may be comprised of materials other than carbonaceous which are inert to the environment of the battery and the attack of halogen. By "inert" is meant that the material is essentially stable in the battery environment and substantially stable to the halogen. Suitable electrode metals are exemplified in U.S. Pat. No. 3,441,495.

In addition to having a metallic porous halogen electrode, the metal electrode may also be comprised of an inert valve metal substrate upon which the metal from the aqueous metal halide electrolyte may be deposited during the charging of the electric energy storage device, which deposited metal reverts to the ionic state during discharge. The inert valve metal substrate may have on at least a portion of its surface another metal which is a precious metal, such as, gold, silver, and the like, or a platinum family metal, such as platinum, palladium, ruthenium, rhodium, osmium, iridium, and the like. Preferably, the metal coating on the valve metal is platinum, palladium or ruthenium.

It is to be appreciated that the valve metal substrate should be pre-treated to remove the oxide formed on its surface prior to placing the metal coating on the valve metal substrate. Such pre-treatments or activation steps are well known, and include anodic etch in ethylene glycol and hydrofluoric acid, chemical etch using dichromic acid, sodium salt and HF, vapor blasting, hydrochloric acid etch, and like procedures.

The precious or platinum family metal coating may be deposited in any of the usual means such as spraying solutions thereof on to the valve metal surface or dipping or immersing the valve metal into the solution of the catalytic metal. Such a solution may be aqueous or alcoholic, such as lower aliphatic alcohols. In addition, the catalytic metal may be electrolytically deposited on to the valve metal or it may be deposited by normal vapor deposition techniques.

A preferred means of applying the platinum family metal to the valve metal is as follows. A solution of 10.0 grams of isopropyl alcohol, 0.5 grams ruthenium chloride (40% ruthenium) and 1.0 gram anise oil is admixed and into this solution the cleaned titanium plates were immersed. The plates were then air dried and baked in an oven.

Figure 5:
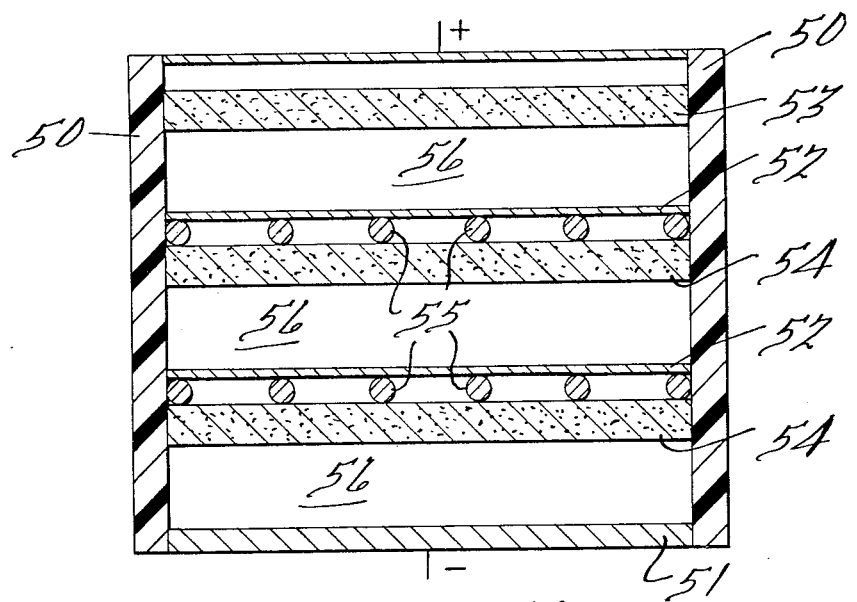
FIG. 5 is a bottom view of a three cell battery having two metallic bipolar electrodes positioned between the end plates.

A suitable metallic bipolar cell may be fabricated as is shown in FIG. 5, which is a three cell stack used as the electrode comparment in a secondary electric energy storage device as is described in U.S. Pat. No. 3,713,888. The figure is a bottom view of the stack, without manifolding and other accessories.

In FIG. 5, Numeral 51 indicates the metal electrode end plate upon which metal from the aqueous metal halide electrolyte is deposited during charging and where Numeral 53 is the porous valve metal electrode (positive electrode) end plate. This porous halogen electrode may be supported as shown in the drawings by attachment to the frame or it may additionally have supporting members at the back of the porous electrode and the end metal plate in order to maintain sufficient separation for electrolyte flow. The bipolar units of the present invention are held in plastic frames Numeral 50 and are formed by attaching the metal substrate Numeral 52 to the metallic porous electrode Numeral 54. In order to allow adequate space for electrolyte to pass through the back sides of the metallic negative electrode Numeral 52 and the metallic porous positive electrode Numeral 54, metal wires Numeral 55 are used to separate the metallic plates. The metal wires Numeral 55 are normally comprised of the same metallic constituent (valve metal) as the metal electrodes. The wires need only be electrically conductive and inert in order to maintain zero potential between the metallic bipolar structure comprised of the segments 52, 54, and 55.

It is to be appreciated that FIG. 5 is somewhat of a simplification of the arrangement of the metallic electrodes. Therefore, various means would normally be used to maintain the appropriate inter-cell spacing between the bipolar structures and the end plates and bipolar structures. Such means may be inert plastics or metals positioned as stated above to give support to the segments 52 and 54, so as to provide structural strength to a battery made up of a number of the bipolar segments 52, 54 and 55 to thereby allow the appropriate inter-cell spacing 56.

Figure 6:
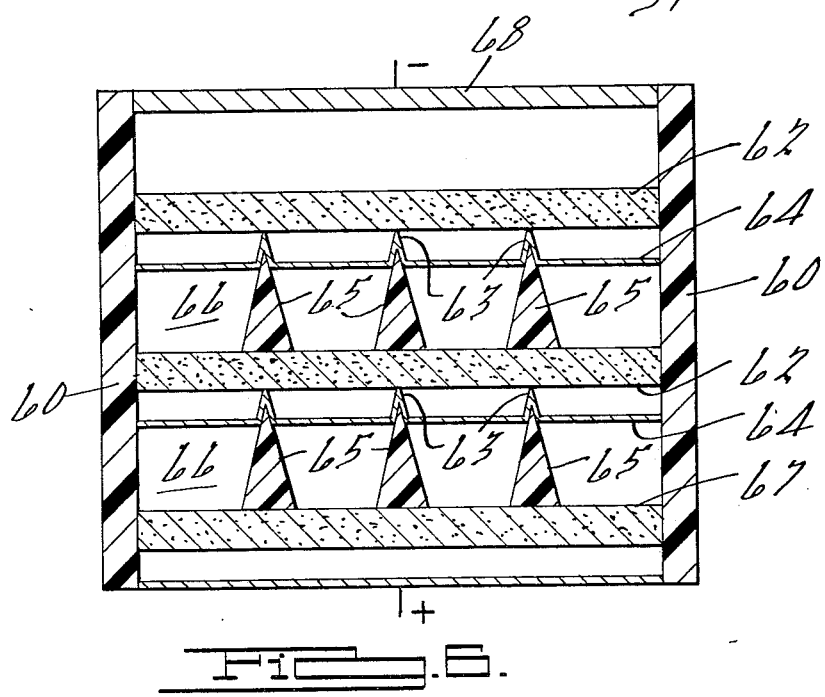
FIG. 6 is a bottom view of another arrangement of a three cell battery having metallic bipolar electrodes.

Another means for forming the bipolar electrode structure of the present invention is that shown in FIG. 6 which is a bottom view without accompanying manifolding, electrode frames, end plates and the like of a three cell stack having two bipolar electrode structures held in suitable plastic frames Numeral 60.

The bipolar structure of FIG. 6 is preferably comprised of metallic elements, such as a porous valve metal electrode Numeral 62 and gas and electrolyte impervious solid member Numeral 64. In order to provide passageways for division of the electrolyte across the back of the porous electrode Numeral 62 and to give support to the metal electrode Numeral 64 impressions Numeral 63 are made at various points along the surface of the electrode. Into the impressions are inserted support members Numeral 65. These members, in addition to supporting the next porous electrode Numeral 62 also permits a ready means of establishing the appropriate inter-cell spacing Numeral 66. By varying the dimensions of support members Numeral 65, one can alter the intercell spacing Numeral 66. The support members Numeral 65 are normally non-conducting and inert to the environment. Halogen electrode end plate Numeral 67 and metal electrode end plate Numeral 68 are also shown in this view.

The highly electropositive metal, which may be plated out on the front surface of the negative electrode during charging of the battery, by passing a direct current through a metal halide electrolyte in contact with the battery electrodes, may be of any suitable metal of a sufficiently high electromotive force to generate a satisfactory battery voltage in conjunction with the halogen employed, such as a Group II-B or VIII metal. Although, iron, cobalt, and nickel, all of which have sufficiently high e.m.f.'s, the most preferred metal, with the highest practical e.m.f. and the lowest comparative weight, and most suitable for use in these processes, is zinc. Other suitable metals are listed in U.S. Pat. No. 3,713,888 entitled, Process for Electrical Energy Using Solid Halogen Hydrates.

The thickness of zinc on the negative electrode is normally from about 25 to 4,000 microns thick, preferably from 100 to 1,500 microns, but in suitable circumstances, other thicknesses of zinc may of course be useful. Similar thicknesses of other metals may be used, when they are employed.

The electrolyte is a metal salt corresponding to the metal deposited on one electrode surface and the anion normally the halogen utilized. Although bromine may be the halogen in some embodiments of the invention, it is preferable to utilize chlorine. Therefore, the electrolyte salt will usually be zinc chloride. In the electrolyte, the concentration of metal halide in the aqueous medium may be from about 0.1% to saturation, but because the maximum concentration, compatible for storage of the halogen hydrate as described in U.S. Pat. No. 3,713,888, a preferred range of metal chloride concentration is 5% to 50%, with the most preferred range being about 10% to about 35%.

The concentration of zinc chloride in the electrolyte will usually be 10% to 35%, during both charge and discharge, with the higher concentrations at the beginning of charge and at the end of discharge.

The use of the zinc-chlorine system is superior to the use of a system depending on bromine, because chlorine is lighter than bromine thereby contributing to the high energy density of the battery, and additionally, is more readily removed from the electrolyte medium when the battery is being charged. The lower solubility of chlorine in electrolyte decreases its diffusion to the zinc electrode, as compared to bromine, and accordingly results in a lower level of self-discharge reactions with zinc. Chlorine, being a gas, passes off and may be readily recovered in the form of chlorine hydrate, from which it may be released when desired for discharging the battery and supplying electricity to external motors and like mechanisms.

The temperature of the electrolyte may vary over a wide range, but usually is from −20°C. to 80°C. Pressures will be between 0.2 to 10 atmospheres.

Although other materials are not required in the electrolyte to make the battery operative, it is generally preferred to add compounds which control the deposition of zinc on and its removal from the metal electrode to avoid formation of dendrites.

In operation, a saturated or nearly saturated solution of zinc chloride containing from about 0.1 to 0.2 to 3 volumes of chlorine at a temperature of approximately 15°C. to 40°C., preferably about 30°C., was directed into the passageways of the electrodes between the impermeable member and the porous member and through the pores of the porous halogen electrode into the inter-cell spacing of the cell at a rate such that the linear velocity upward through the cell averaged from 2 to 100 cm./second. The pressure differential to have such a flow was in the range of about 0.01 to 1 kg./sq. cm. The cell voltage generated was about 2.1, open circuit, and the finished battery had a capability of supplying about 5,000 watt-hours with 125 cells, each electrode having a surface area of 200 cm$^2$.

After passing through the inter-cell spacing, the electrolyte streams are mixed together and additional chlorine is dissolved in the electrolyte to bring it up to the desired content of about 60 volume percent. Preferably, the chlorine is supplied by decomposition of chlorine hydrate. The use of chlorine hydrate is especially desirable because the water added with the chlorine reduces the concentration of the zinc chloride, which has been increased by dissolving some of the zinc and by the ionization of the chlorine in a previous pass of the electrolyte through the reaction zone, thus resulting in reasonably constant zinc chloride concentrations. The hydrate may be made by several methods, such as those described in U.S. Pat. No. 3,793,077, and U.S. Pat. No. 3,823,036.

After discharge of the battery, the cells thereof are recharged by connecting a source of direct current at the appropriate voltage to the electrodes, with the positive pole of the source being connected to the porous electrode at one end of a plurality of these bipolar electrodes and the negative pole of the source connected to the impermeable wall at the other end of the group of electrodes. It is to be appreciated that appropriately designed end plates may be made by utilizing the porous portion only or the impermeable portion only, respectively attached to the positive and negative poles. Current is caused to flow until a suitable thickness of zinc forms on the front side of the impervious member indicating sufficient charging. Zinc ions from the zinc chloride electrolyte are then converted to zinc metal and plate out on the impermeable electrode. Chlorine developed at the porous electrode base member during charging is removed, separated from the electrolyte and converted to chlorine hydrate, where it remains as a source of chlorine for use when the battery is to be discharged. After circulating through the cells, the zinc chloride electrolyte passes into contact with a more saturated solution of zinc chloride or solid zinc chloride and the additional amount of the salt is added to the electrolyte to maintain its desired high content therein.

The following examples illustrate the operation of the invention. All parts are by weight and all temperatures are in °C. unless otherwise mentioned.

EXAMPLE 1

A bipolar electrode for a high energy density secondary battery cell was made by cementing an impervious graphite layer on to a pre-formed porous carbon base and coating the impervious graphite with a highly electropositive metal. The electrodes made were square, had surface areas of about 170 square centimeters, were approximately 3 millimeters thick and were cemented together with an epoxy resin-ester cement which is resistant to the electrolyte employed and to chlorine. The porous carbon was about 2.5 mm. thick, including the passageways therein and the graphite was about 1/5 the carbon thickness. The passageways were cut about half way through the thickness of the porous carbon and extended, as illustrated in FIG. 2 of the drawings, almost to the end of the electrode. They were rectangular, with widths about twice their thicknesses. The graphite was a nonporous graphite identified as ATJ by the manufacturer, Union Carbide Corporation. It is of limited porosity and of a relatively high density, having been resin filled and baked and refilled and rebaked for a sufficient number of times to densify the graphite and make it gas impervious. The porous amorphous carbons employed are identified as Grade 45 or Grade 60, also by Union Carbide. The porosity of the carbon was such that 45% to 50% thereof was void and the pore sizes was in the 25 to 50 micron range.

The electrolyte used was an aqueous zinc chloride which, during discharge of the cell, contained about 3 grams per liter of dissolved chlorine. At the beginning of discharge, the electrolyte had about 15% of zinc chloride and at the end of discharge, this had been increased to about 35%. Conversely, at the beginning of charge, the electrolyte was 35% zinc chloride and at the end of discharge, approximately 15% zinc chloride. In discharge, the cell developed 2.1 volts open circuit and 1.65 to 1.70 volts at eight amperes. A combination of 24 cells having 23 bipolar structures and two end plates, the positive end plate being the porous electrode portion of the bipolar unit and the negative end plate being the imprevious electrode portion of the bipolar unit, electrically connected in series and with common manifolds for electrolyte flows in and out, developed fifty volts open circuit and forty volts under an eight ampere load. During charging of the battery, the flow rate was about 600 milliliters of electrolyte per cell per minute and during discharge, it was about 400 mls per cell per minute.

To start up the cell, which was of the design illustrated in the figures of the drawing, electrolyte (35% zinc chloride) was pumped through the porous carbon anode to the reaction zone of the cell at the mentioned charging rate. Normally, in the example given herein, the pressure was held at approximately atmospheric plus the head required for flow, usually from 1 to 2 pounds/in$^2$.

With about 60 volts applied to the battery or about 2.5 volts applied to an individual cell, the cells were charged by circulation of electrolyte through them, which released chlorine at the surface of each porous electrode and deposited zinc on the graphite surface of each negative electrode. Generally, charging took about 2 hours, after which time the zinc was deposited in an even layer about 200 microns thick. Then, the cell was ready for use (discharge).

In use aqueous electrolyte at 15% zinc chloride concentration and containing about three grams per liter of dissolved chlorine was forced through the cell at the rate of about 400 mls per minute, penetrating the porous carbon and entering the reaction zone. There was generated an open circuit voltage of about 2.1 volts per cell, and was about 1.7 volts per cell at eight amperes. As is illustrated by the sizes of the arrows in FIG. 1, the flow through the porous carbon was regular and flow in the reaction zone increased as the top of the cell was approached. An electrolyte change was made about every 2.5 seconds.

After the electrolyte had flowed through the cell on discharge and had consumed the dissolved chlorine, it was renewed by being saturated with chlorine and being returned to the cell, where discharging operation continued. On discharge, the zinc of the negative electrode was dissolved, as was the chlorine, in the electrolyte forced through the porous anode and the concentration of zinc chloride approached 35%, at which time, discharging was complete and the cell was recharged. The opposite reactions occur, of course, during charging. During discharging, the total flow of electrolyte may be diminished to approximately 70% of that during charge.

EXAMPLE 2

The procedures of Example 1 were repeated but the conditions were changed so that the electrolyte was nickel chloride and the electropositive metal was nickel. The batteries were heavier and the efficiency of electricity generation was lower, however, such batteries were quite feasible.

When the dimensions of the cells were changed so that the reaction zones were twice as thick, the battery size must be increased, and, therefore, such cells are generally not as satisfactory as that previously mentioned in Example 1. Variations in the nature of the porous amorphous carbon over the porosity range from 30% to 60% do not seriously affect efficiency nor does operation at temperatures in the 20° to 40°C. range, rather than 30°C., as in Example 1. When the amorphous carbon being used has larger pores, the efficiencies of charge and discharge are diminished so that when the pores are over 300 microns in diameter, there is a noticeable falling off of efficiency. This is also true when the circulation in the reaction zone is maintained so high by increase in pressure of the electrolyte passing through the pores and increases in the pore sizes so that the chlorine gas contacts the zinc electrode.

EXAMPLE 3

In a three cell stack having two bipolar electrodes in between two end plates as in Example 1 and comprised of carbonaceous materials, each electrode having 25 in$^2$ surface area and spaced 50 mils apart, there was flowed a 25% by weight zinc chloride electrolyte at a rate of 1.2 liters/min. The zinc metal was deposited on to the negative electrode surface while chlorine was generated at the positive electrode surface. The chlorine was removed from the electrode compartment by the flowing electrolyte. It may be stored external to the electrode compartment by normal liquefaction techniques. The battery was charged at the following rates. The charging was concluded when 600 amp - minutes were charged. See Table I.

After 600 amp – charge, the open cell voltage was 6.30 - 6.27 which compares favorably with the theoretical e.m.f. of 6.36.

The cell was then discharged by flowing the electrolyte at the above rate and passing sufficient chlorine into the cells from a cylinder of chlorine to keep the electrolyte saturated with chlorine. If chlorine hydrate were used as the source of chlorine, the rate of decomposition would be adjusted so as to give a saturated zinc chloride electrolyte. See Table II.

TABLE I

| Charge Rate (Amps) | Amps Minutes | Voltage Across the Three Cells |
|---|---|---|
| 10 | 108 | 7.93 |
| 10 | 280 | 8.14 |
| 12 | 250 | 8.14 |
| 12 | 273 | 8.30 |
| 12 | 295 | 8.32 |
| 14 | 300 | 8.45 |
| 14 | 400 | 8.42 |
| 14 | 500 | 8.33 |
| 14 | 580 | 8.28 |

TABLE II

| Discharge Amps | Amps Minutes | Voltage |
|---|---|---|
| 1 | 2 | 5.84 |
| 2 | 6 | 5.63 |
| 4 | 7 | 5.31 |
| 4 | 14 | 5.32 |
| 6 | 15 | 5.06 |
| 6 | 26 | 5.09 |
| 8 | 44 | 4.85 |
| 10 | 66 | 4.53 |
| 12 | 90 | 4.27 |
| 14 | 118 | 3.93 |
| 1 |  | 5.95 |
| 40 | 120 – 123 | 1.37 |
| 8 | 124 | 6.02 |
| 8 | 125 | 5.18 |
| 8 | 134 | 5.08 |
| * | 137 | 6.18 |

*Open Circuit Voltage.

The purpose of the experiment was to charge and discharge the cells to determine the ability of the zinc-chlorine battery to carry various charge and discharge rates with the bipolar electrodes of the present invention.

EXAMPLE 4

A battery was constructed of carbonaceous electrodes, such as those described in FIGS. 1–4. The battery was comprised of 5 modules, each module having 12 sub-modules connected in series. Each sub-module had 24 cells, thereby having a desired open circuit voltage of about 50 volts. The electrolyte (20% by weight zinc chloride) was flowed through each sub-module in parallel flow patterns at a flow rate of 600 ml/cell. The battery was charged for three hours whereby the zinc was deposited on to the front sides of the impervious electrode. The chlorine generated was disposed of. Chlorine hydrate was formed separately by passing chlorine into a cooled aqueous solution and placed into the storage compartment. The chlorine hydrate had 27% by weight chlorine. During discharge, the electrolyte was circulated through the electrode compartment, at a rate of about 400 ml/cell, and the storage compartment, thereby decomposing the chlorine hydrate and dissolving the chlorine. The chlorine was then available for discharge with the zinc. Five of the modules were placed in an electrically driven automobile (which weighed about 4200 pounds plus 2 passengers) which was driven for about 150 miles at a constant speed of 50 miles an hour. Each module delivered 8.16 KWH of electric energy.

EXAMPLE 5

An electrode compartment having 36 cells, three units of 12 cells connected in parallel, was constructed having the bipolar structures of FIG. 5. The electrode compartment was connected to a reservoir of aqueous zinc chloride and the electrolyte was circulated from the reservoir to the electrode compartment and back. To facilitate testing of the bipolar structures, the chlorine generated was disposed of although it could have been stored in a storage compartment as chlorine hydrate or liquified chlorine, by known techniques.

To five liters of a 35% by weight zinc chloride solution was added 25 mls. of a polyoxyalkylene derivative of ethylenediamine. The electrolyte was flowed into the base of each bipolar unit, up the passageways formed by the attachment of the back sides of impervious member Numeral 52 and porous member Numeral 54 which were in a vertical position. The wires Numeral 55 provided a convenient means of dividing the upward flow of electrolyte. The surface area of each electrode surface was about 28 in.$^2$ and the inter-cell spacing between each of the bipolar structures was 55 mils. The electrode surfaces were coated with ruthenium in accordance with the preferred procedures outlined above. The pH at the beginning of the charge was 4.98. Ambient temperature and pressure was employed. The stack was charged at 20 amps with the voltage ranging from 27.8 to 28.1 for 3500 amp minutes. The flow of electrolyte through the stack was maintained at 4.4 liters/min. At the end of charge, the pH of the electrolyte was 0.20.

At the start of discharge, the open circuit voltage was 24.5 volts. Discharge was commenced by saturating the electrolyte with chlorine from a cylinder of liquid chlorine. The flow of electrolyte on discharge was 4.4 liters/minute. The discharge amperage was gradually increased to 20 amps after a discharge of 200 amp minutes.

The discharge continued to 1000 amp minutes at 20 amps and was then decreased to 15 amps until 1300 amp minutes was reached. At that point the amperage was decreased to 10.1 for another 100 amp minutes when the amperage was decreased by 5. After 1500 amp minutes of discharge, the open circuit voltage was 15.2 volts and the discharge reaction was terminated.

Various changes and modifications to the inventive concepts herein disclosed have been noted, and these and other variations may of course be practiced without departing from the spirit of the invention or the scope of the subjoined claims.

What is claimed is:

1. A bipolar electrode apparatus for use in a secondary electric energy storage device, comprising a first member permeable to electrolyte, but gas impermeable and through which electrolyte containing dissolved oxidant may be caused to flow during both the charge cycle during which current is passed through the electrode apparatus causing electrochemical deposition of oxidant on the said first member, and which during the discharge cycle dissolved oxidant may be electrochemically reduced within the porous member, said first member having a porosity between 20% and 80% of its volume and a pore size from about 5 to 300 microns and having a flat front side and a grooved back side so as to be maintained in a flooded condition, a second member which is both gas and electrolyte impermeable and having a flat front side suitable for electrochemical deposition of a highly electropositive metal by means of passage of said current during the charge cycle and from which said highly electropositive metal may be electrochemically oxidized during the discharge cycle, said first and second members having a relative thickness in the ratio of between about 1:1 and 5:1 and being formed with a plurality of passageways generally from 5 to 25 in number, from 0.5 to 2.0 centimeters in width and from 0.5 to 5 millimeters in depth with a ratio of width to thickness in the range of approximately 2.1 to 10.1, and conductive means attaching the backsides of the first and second members of the bipolar electrode apparatus to thereby provide said front side of the first member as a positive electrode in one cell and said front side of the second member as the negative electrode of a second cell.

2. An electric energy storage device comprising an electrode compartment means containing therein at least one bipolar electrode apparatus of claim 1, wherein an oxidizable metal is on the front side of the negative electrode, which metal oxidizes upon discharge and is reduced and deposited upon charge, a storage compartment means containing a source of halogen available for discharge and a storage compartment available for storage of halogen during charge, conduit means connecting the electrode compartment means and the storage compartment means, means for communicating an aqueous metal halide electrolyte with the positive and negative electrodes, and means for passing the halogen from the storage compartment means through the conduit means to the electrolyte in the electrode compartment during discharge and from the electrode compartment through the conduit means to the storage compartment during charge.

* * * * *